US006714238B2

(12) United States Patent
Urisaka et al.

(10) Patent No.: US 6,714,238 B2
(45) Date of Patent: Mar. 30, 2004

(54) VIDEO/AUDIO COMMUNICATION SYSTEM WITH CONFIRMATION CAPABILITY

(75) Inventors: Shinya Urisaka, Yokohama (JP); Tomoaki Kawai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/815,480

(22) Filed: Mar. 11, 1997

(65) Prior Publication Data

US 2002/0057347 A1 May 16, 2002

(30) Foreign Application Priority Data

Mar. 13, 1996 (JP) ............................................. 8-055661

(51) Int. Cl.[7] .......................... H04N 5/232; H04N 7/14
(52) U.S. Cl. .............................. 348/211.99; 348/211.1; 348/211.8; 348/211.13; 348/14.05
(58) Field of Search .......................... 348/14, 15, 211, 348/143, 358, 14.01, 14.02, 14.05, 14.08, 14.09; H04N 7/14, 7/15

(56) References Cited

U.S. PATENT DOCUMENTS

| | | | | |
|---|---|---|---|---|
| 4,992,866 A | * | 2/1991 | Morgan ........................ 348/15 |
| 5,012,509 A | * | 4/1991 | Nakamura et al. ............ 348/15 |
| 5,418,919 A | * | 5/1995 | Kadosawa et al. .......... 395/379 |
| 5,444,833 A | * | 8/1995 | Kawai et al. ................ 345/433 |
| 5,481,297 A | * | 1/1996 | Cash et al. .................... 348/13 |
| 5,499,362 A | * | 3/1996 | Kawai et al. ................ 395/109 |
| 5,570,115 A | * | 10/1996 | Kawai et al. ................ 345/199 |
| 5,577,107 A | * | 11/1996 | Inagaki ........................ 348/15 |
| 5,642,124 A | * | 6/1997 | Kawai et al. ................... 345/2 |
| 5,666,555 A | * | 9/1997 | Okazaki et al. ............. 345/302 |
| 5,719,622 A | * | 2/1998 | Conway ..................... 348/211 |
| 5,737,011 A | * | 4/1998 | Lukacs ........................ 348/15 |
| 5,742,329 A | * | 4/1998 | Masunaga et al. ............ 348/15 |
| 5,745,161 A | * | 4/1998 | Ito ............................... 348/15 |
| 5,757,418 A | * | 5/1998 | Inagaki ........................ 348/15 |
| 5,764,236 A | * | 6/1998 | Tanaka et al. .............. 345/429 |
| 5,767,897 A | * | 6/1998 | Howell ........................ 348/15 |
| 6,137,485 A | * | 10/2000 | Kawai et al. .......... 348/211.99 |

* cited by examiner

*Primary Examiner*—Wendy Garber
*Assistant Examiner*—Luong Nguyen
(74) *Attorney, Agent, or Firm*—Morgan & Finnegan, LLP

(57) ABSTRACT

A system utilizes the camera control server of the CPU to transfer the camera control command, received through the network, to the camera control device to control the camera in order to vary the audio input/output characteristics in linkage with the camera operation and to thereby improve the realistic feeling. In more details, the camera control server also sends control commands to the audio input control device, the audio output device and the video display control device according to the camera control thereby controlling the input characteristics (spreading, direction and sensitivity) of the microphone and the output characteristics (spreading, direction and depth) of the speaker and varying the image displayed on the monitor. The system also includes technology for displaying, on the monitor, the information on the operator of the camera and on the receiver of the image, and for varying the direction of the monitor according to the panning or tilting operation of the camera.

19 Claims, 6 Drawing Sheets

FIG. 7

| PAN | 10° |
|---|---|
| TILT | 20° |
| ZOOM | THREE TIMES |

88

| RECEIVING HOST | RECEIVING USER LOG IN NAME | OPERATOR | ICON FILE NAME |
|---|---|---|---|
| hostA | person1 | ○ | FILE 1 |
| hostB | person2 | × | FILE 2 |
| hostC | person3 | × | FILE 3 |
| ⋮ | ⋮ | ⋮ | ⋮ |

90

VIDEO/AUDIO COMMUNICATION SYSTEM WITH CONFIRMATION CAPABILITY

BACKGROUND OF THE INVENTION

1. Field of the Invention

The present invention relates to a video/audio communication, a video communication system, a transmission terminal and a reception terminal, and more particularly to a video/audio communication, a video communication system, a transmission terminal and a reception terminal for mutual audio and/or video communication among plural terminals present in scattered locations on a network.

2. Related Background Art

There is recently developed a video/audio communication system utilizing a computer network and allowing to recognize the status of one or plural distant sites in one site or in mutual manner (for example so-called awareness system). Such video/audio communication system is ordinarily composed by connecting plural computers or communication terminals, each connected to a video camera of which image taking direction and/or image taking magnification is externally controllable and a microphone which is non-directional or has controllable directionality, to a computer network, in such a manner that the image and the voice respectively entered by such camera and microphone can be transmitted to the network.

Also a terminal receiving such image and voice from the network selectively displays and outputs the plural images and voices from plural sites respectively on an image display device and from a speaker.

However, in such conventional video/audio communication system, it has been difficult to identify, in the image transmitting side, by whom the image taken by its camera is observed (by which terminal the image is received and displayed). Such drawback is not limited to the camera but is present also in other resources such as the storage device.

Also in the remote controlling side of the camera, the obtained image lacks the realistic feeling because the input and output status of the voice transmitted with the image does not change at all even when the image taking direction of the camera (by panning and tilting) and the image taking magnification thereof (by zooming) are varied.

An object of the present invention is to resolve the above-mentioned drawbacks individually or entirely and to provide a video communication system allowing the image transmitting side to easily confirm the operator of the camera or the operation status thereof.

Another object of the present invention is to provide a video/audio communication system capable of improving the realistic feeling by varying the voice input and output in linkage with the camera operation.

The above-mentioned objects can be attained, according to a preferred embodiment of the present invention, by a video/audio communication system or a video communication system for video/audio or video communication through a network, comprising information providing means in the image transmitting side, for giving information to the observed person, wherein the information displayed on the information providing means is varied according to the zooming operation of the image input means, whereby the status of operation of the image input means can be easily recognized at the image transmitting side.

Also in such system, the observer of the transmitted image and the operator of the image input means can be readily recognized by the display of at least either of the still icons and the names of such observer and the operator.

Also the status of the zooming operation can be readily recognized by varying the magnification of the display on the information providing means in correspondence with the zooming magnification of the image input means.

SUMMARY OF THE INVENTION

An object of the present invention is to resolve the above-mentioned drawbacks individually or entirely.

Another object of the present invention is to facilitate understanding by the image transmitting side, how the resources of its terminal are utilized.

Still another object of the present invention is to facilitate understanding by the image transmitting side, by whom the image taking device of its terminal is operated.

The above-mentioned objects can be attained, according to a preferred embodiment of the present invention, by a video/audio communication system or a video communication system for video/audio or video communication through a network, comprising information providing means in the image transmitting side, for giving information to the observed person, wherein the information displayed on the information providing means is varied according to the zooming operation of the image input means, whereby the status of operation of the image input means can be easily recognized at the image transmitting side.

Also there is provided a system, in which the observer of the transmitted image and the operator of the image input means can be readily recognized by the display of at least either of the still icons and the names of such observer and the operator.

Still another object of the present invention is to provide a system terminal having novel functions.

Still other objects of the present invention, and the features thereof, will become fully apparent from the following description of the embodiments, which is to be taken in conjunction with the attached drawings.

BRIEF DESCRIPTION OF THE DRAWINGS

FIG. 7 is a view showing an example of the camera control table managed by a camera control server 74.

DESCRIPTION OF THE PREFERRED EMBODIMENTS

Now the present invention will be clarified in detail by a preferred embodiment thereof, with reference to the attached drawings.

Figure 1:
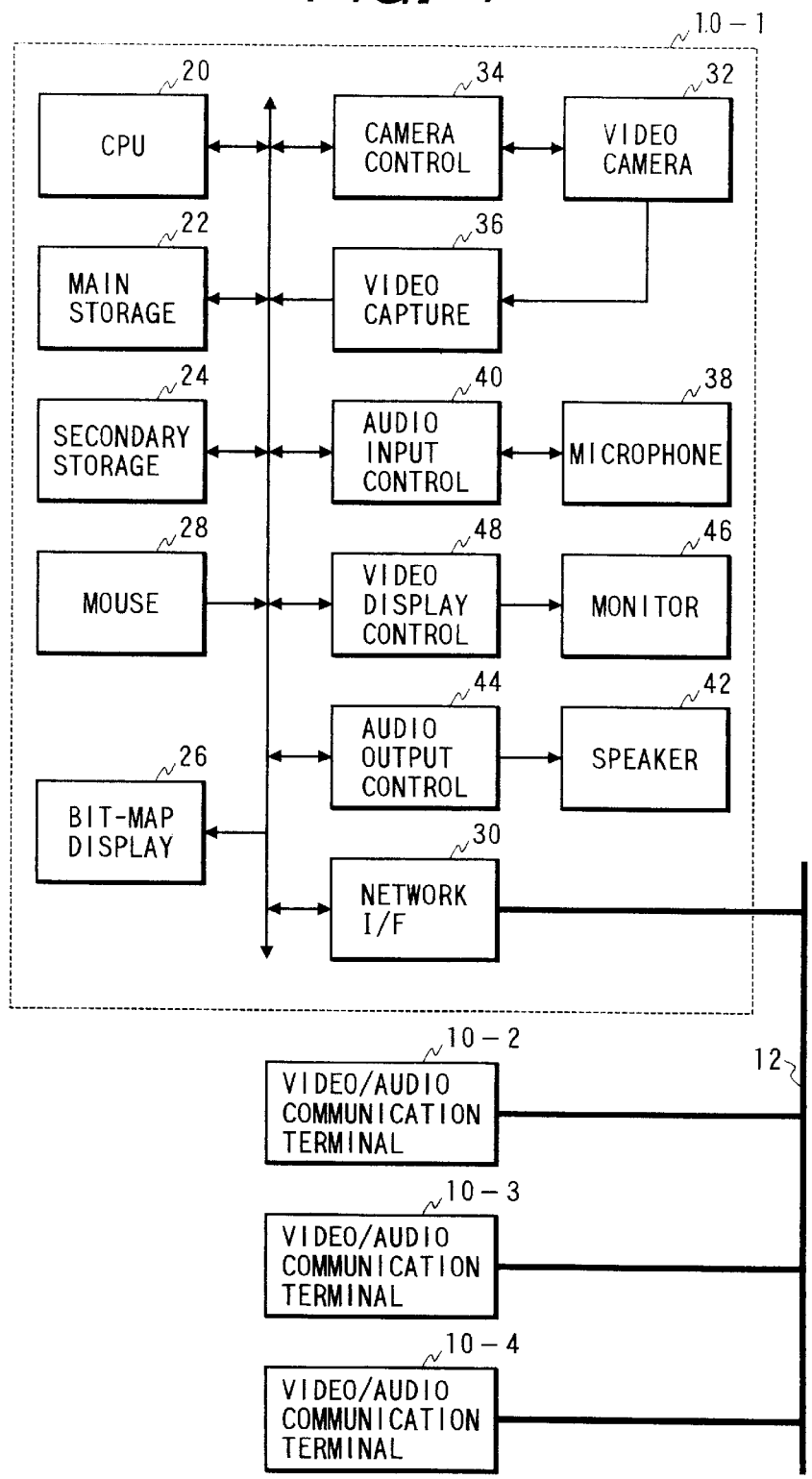
FIG. 1 is a schematic block diagram of an embodiment of the present invention.

FIG. 1 is a schematic block diagram of an embodiment of the present invention, wherein video/audio communication terminals 10-1, 10-2, 10-3, 10-4, ... connected to a network 12 for audio and video transmission and reception have an identical configuration. More specifically, each of the video/audio communication terminals 10-1, 10-2, 10-3, 10-4, ... is provided, as in the ordinary computer, with a CPU 20 for entire control, a main storage 22, a secondary storage 24 (for example a hard disk device), a bit map display 26, a mouse 28 serving as a pointing device and a network interface 30.

Each of the video/audio communication terminals 10-1, 10-2, 10-3, 10-4, ... is further provided, as the video input/output means, with a video camera 32 of which image taking direction, image taking magnification, focus state and power on/off state are arbitrarily controllable, a camera control device 34 for directly controlling at least one of the panning, tilting, zooming and focusing of the video camera 32, and a video capture device 36 for capturing the output image signal of the video camera 32, and, as the audio input/output means, with a microphone 38 of which directionality (spreading, direction and sensitivity) is controllable by an external control signal, an audio input control device 40 for controlling the directionality and the input level of the microphone 38 according to an instruction from the CPU 20, a speaker 42 of which sound field (spreading, direction and depth) is controllable, and an audio output control device 44 for controlling the sound field of the speaker 42 according to an instruction from the CPU 20. Such sound field control can be achieved by an already known technology.

Each of the video/audio communication terminals 10-1, 10-2, 10-3, 10-4, ... is further provided with a monitor 46 mounted on the video camera 32, and a video display control circuit 48 for causing the monitor 46 to display the image obtained by the video camera 32, according to the operation status thereof.

The speaker 42 may be composed either of a single speaker with controllable sound field or of a speaker device consisting of plural speakers so combined as to render the sound field controllable. Also the monitor 46 may be a display window in the image area on the bit map display 26.

The video output of the video camera 32 is subjected to A/D conversion and compression in the video capture device 36 and is transmitted through the network I/F 30 to the network 12. For simultaneous delivery of the image to plural sites, there is employed multi-cast communication or broadcast communication. Also the audio input to the microphone 38 is subjected to A/D conversion and compression by the audio input device 40 and is transmitted through the network I/F 30 to the network 12. As in the case of image, the audio signal is transmitted by the multicast communication or the broadcast communication for simultaneous delivery to plural sites.

As will be explained later, the audio input control device 40 controls the directionality (spreading, direction and sensitivity) of the microphone 38, so as to match the video input state of the video camera 32, corresponding to the panning, tilting and zooming control of the video camera 32 by the camera control device 34.

The audio output control device 44 expands the input audio information and effects D/A conversion for supply to the speaker 42. In this operation, the audio output control device 44 controls the spreading, direction and depth of the output sound field of the speaker 42, so as to match the input status of the video camera connected to the communication terminal at the source of the audio information, according to the operation status of such video camera.

The camera control device 34, the audio input control device 40 and the audio output control device 44 can also be controlled from a remote site through the network 12. The format and the compression method for the video and audio data are not particularly limited. In the present embodiment, the video/audio communication terminals 10-1, 10-2, 10-3, 10-4, ... are composed of ordinary work stations.

Figure 2:
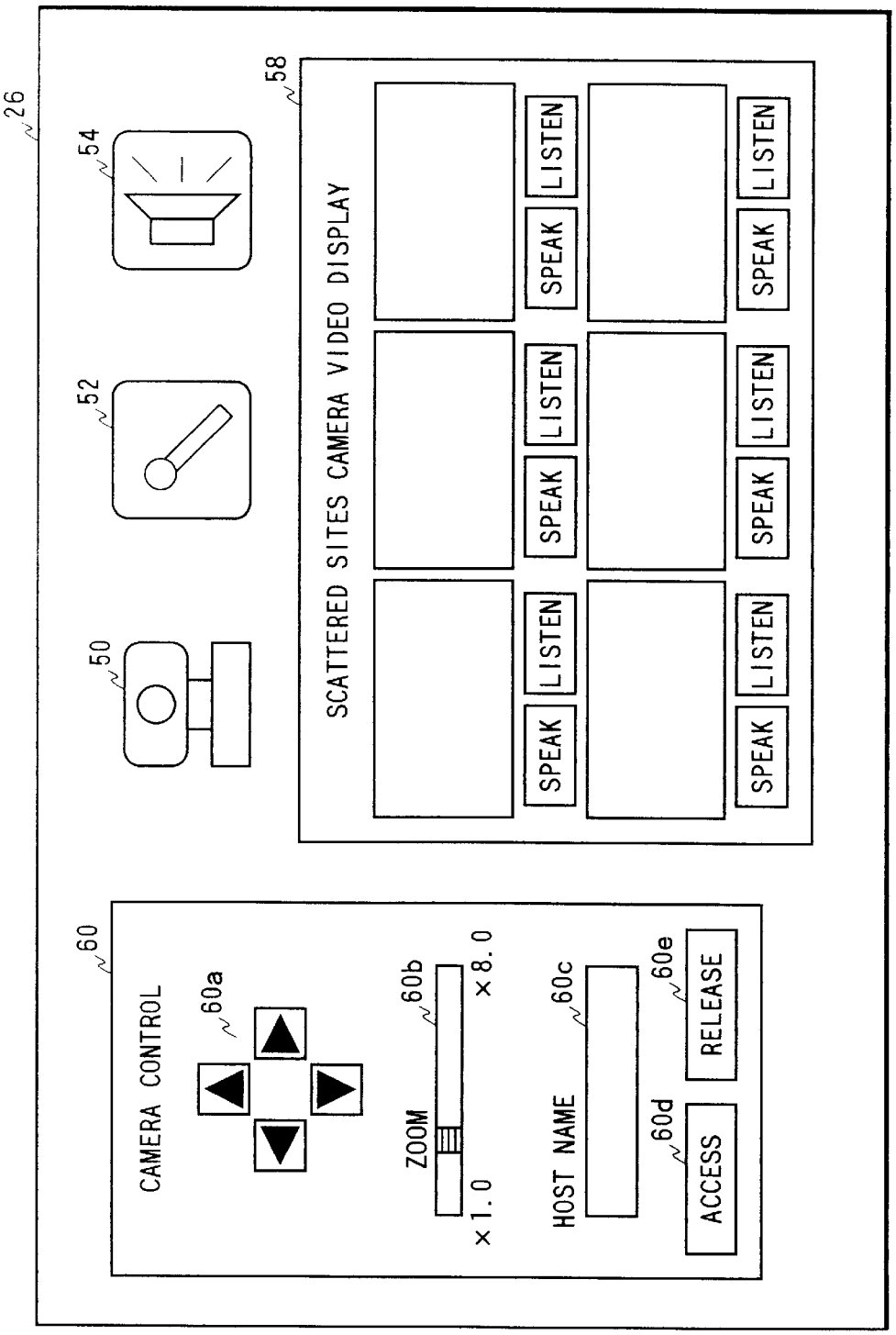
FIG. 2 is a view showing an example of the image display and the camera operation in the above-mentioned embodiment.

FIG. 2 in conjunction with FIG. 1 show an example of the image field displayed on the bit map display 26, on which operated is a window display system capable of displaying plural windows.

A symbol 50 indicates that the video transmission is in progress, and, while this symbol 50 is displayed on the image field, the image taken by the camera 32 is transmitted to the network 12. A video transmission process to be explained later displays this symbol 50 on the image field. A symbol 52 indicates that the audio transmission is in progress, and, while this symbol 52 is displayed on the image field, the audio input by the microphone 38 and the transmission of the input audio signal to the network 12 are rendered effective. A symbol 54 indicates that the audio reception is in progress, and, while this symbol 54 is displayed on the image field, the audio output by the speaker 42 from the network 12 is rendered effective.

These symbols are naturally not limited to those illustrated but can be of any designs displayable on the image field.

A scattered site video display window 58 displays selected ones among the images delivered from other communication terminals (for example, in case of the bit map display 26 of the terminal 10-1, the images from the terminals 10-2, 10-3, 10-4, ... ). The images to be displayed are selected for example by a menu therefor, but such selecting method is not critical. The image from another terminal is renewed at a rate matching the purpose, such as a moving image or a still image renewed for example at every 10 seconds. The transmission rate and the renewal rate are naturally limited by the transmission capacity of the network 12 and the processing capacity of the communication terminals 10-1, 10-2, 10-3, 10-4, A camera control panel 60 is provided with direction buttons 60a for panning (lateral) operation and tilting (vertical) operation, a zoom button 60b for zooming operation, a host name display area 60c for entering and displaying the host name of the video/audio communication terminal to which the camera to be controlled is connected, an access button 60d for requesting the control right for the camera connected to the video/audio communication terminal displayed in the host name display are 60c, and a release button 60e for abandoning such control right. These buttons 60a, 60b, 60c, 60d can be operated in the known method with the mouse 28.

The monitor 46 is composed of small image display means, such as a liquid crystal display panel, fixed to a side of the video camera 32, and changes the direction according to the panning and/or tilting of the video camera 32. The monitor 46 displays the information of the camera operator controlling the video camera 32 and of the receiver receiving the image of the video camera 32. It may also display the control status of the camera.

Figure 3:
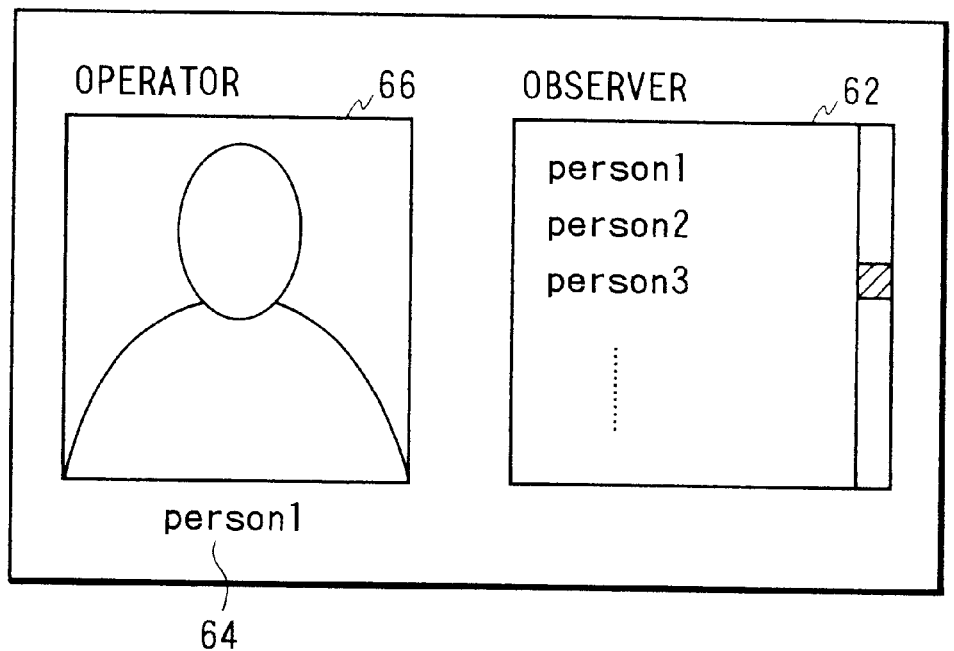
FIG. 3 is a view showing an example of the image displayed on a monitor 46.
Figure 4:
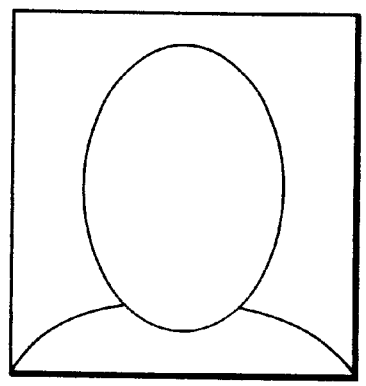
FIG. 4 is a view showing an example of the magnified display of an icon 66 on the monitor 46.

FIG. 3 in conjunction with FIG. 1 show an example of the image field displayed on the monitor 46, including a list 62 of the users receiving (observing) the image from the video camera 32, a name 64 of the user who controls the video camera 32, and an icon (still image) 66 representing the face of the user who controls the camera. Icons representing the faces of the users are stored in advance as an icon file in the secondary storage 24, and a required icon is displayed in the position shown in FIG. 3. The icon 66 is displayed with a magnification corresponding to the zoom ratio of the operated camera 32. For example, if the camera 32 is in a zoomed-in state, the icon 66 is displayed in a magnified manner as shown in FIG. 4. It is therefore made evident that the camera 32 is in a zoomed-in state. As the zoom-in of the camera corresponds to the approaching of the communication partner, such magnified display of the image of the partner provides a natural feeling.

The monitor 46 may also display other information than the user name and the icon, and may also be composed of a CRT or a display device of any other type, instead of the liquid crystal display. Furthermore it may be composed of an external display unit.

In the following there will be explained the control of the directionality of the microphone 38 and the sound field of the speaker 42, corresponding to the panning, tilting or zooming operation of the video camera 32. A panning or tilting operation of the video camera 32 varies the image taking direction thereof, and a zooming operation varies the image taking area (image angle) thereof. In a video or television conference, as the operator of the terminal listens to the voice from the partner and talks to the partner while observing the received and displayed image, the realistic feeling can be increased by controlling the voice according to the manipulation of the image from the partner terminal. Such control is not limited to the volume only but may also include the control of the sound field. In the present embodiment, the input characteristics of the microphone 38 and the output characteristics of the speaker 42 are controlled in linkage with the operation of the camera.

For example, when the direction of the video camera 32 is varied by the panning and/or tilting operation, the directions of the microphone 38 and the speaker 42 are varied according to the direction of the camera 32. With such change in the direction of the microphone 38, the voice in the image taking direction of the camera 32 can be picked up and transmitted to the camera operator. Also the change in the direction of the speaker 42 varies the output direction of the voice from the camera operator, thus allowing the user of the terminal of the camera 32 to realize the positional change of the camera operator.

In case the image taking range of the video camera 32 is made narrower by a zooming operation, the directionality of the microphone 38 and the spreading of the sound field of the speaker 42 are both made narrower, according to the image taking range of the video camera 32. Since the attention is concentrated on a specified object in such case, the directionality of the microphone 38 and the sound field of the speaker 42 are so controlled as to preferentially input and output the voice of such object. In addition, the sensitivity of the microphone 38 is elevated, and the depth of the sound field of the speaker 42 is made larger. On the other hand, in case the image taking range of the video camera 32 is made wider by a zooming operation, the spreading, direction and sensitivity of the microphone 38 and the spreading, direction and depth of the sound field of the speaker 42 are controlled in the opposite direction.

As explained above, the audio input/output characteristics (spreading, direction and sensitivity of the directionality of the microphone 38 and spreading, direction and depth of the sound field of the speaker 42) are matched with the video taking operation status (panning, tilting and zooming).

Figure 5:
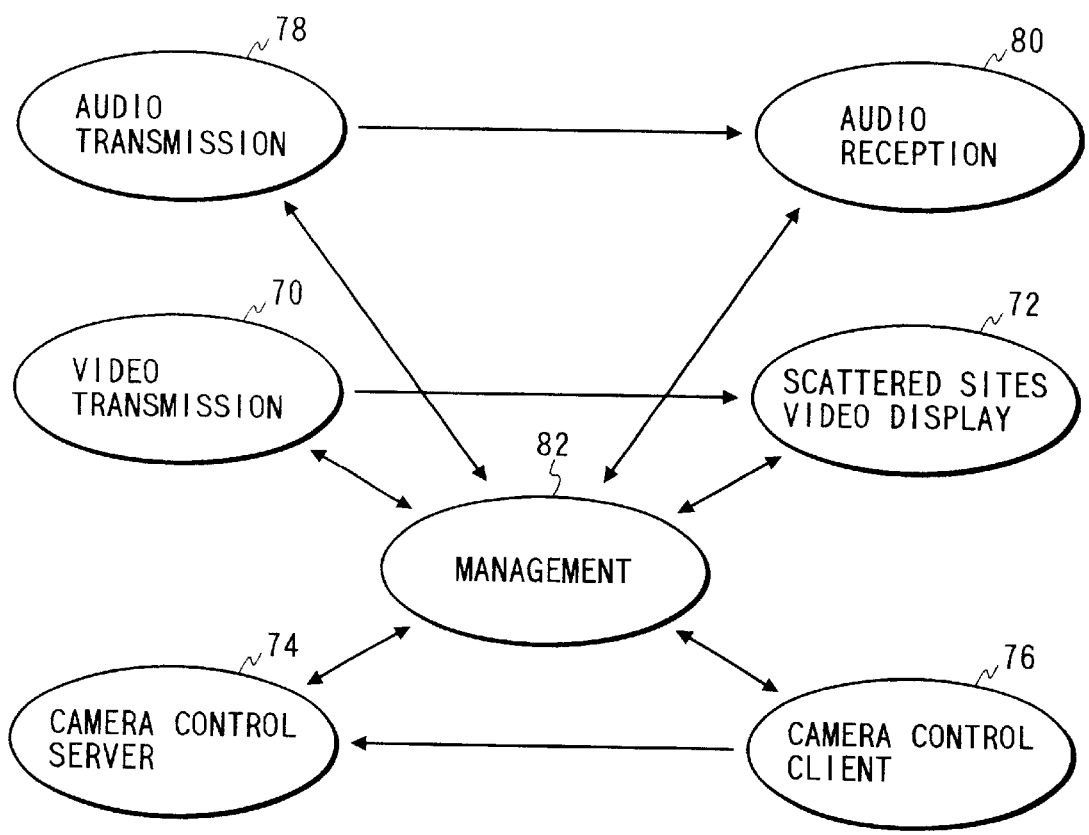
FIG. 5 is a view showing the process configuration of the present embodiment.

FIG. 5 in conjunction with FIG. 1 show process configuration or software configuration of the present embodiment. A video transmission process 70 executes video capture and delivery and controls the display of the symbol 50. A scattered site image display process 72 displays the images of 6 sites arbitrarily designated among the images delivered from other plural sites, in the areas of the scattered site image display window 58. A camera control server 74 controls the camera 32 by receiving a camera control command through the network 12 and transferring such command to the camera control device 34. The camera control server 74 also sends control commands to the audio input control device 40, the audio output device 44 and the video display control device 48 according to the camera control, thereby controlling the input characteristics of the microphone 38 and the output characteristics of the speaker 42, and varying the image displayed on the monitor 46.

A camera control client 76 displays the camera control panel 60 on the image field of the display 26, and transmits a camera control command from such control panel, through the network 12, to the camera control server 74 of a video/audio communication terminal displayed in the host name display area 60c.

An audio transmission process 78 executes audio capture and delivery and controls the display of the symbol 52. An audio reception process 80 executes simultaneous or selective audio output by mixing the audio signals transmitted from the scattered sites, and controls the display of the symbol 54.

The video transmission process 70, the scattered site video display process 72, the camera control server 74, the camera control client 76, the audio transmission process 78 and the audio reception process 80 function on each of the video/audio communication terminals 10-1, 10-2, 10-3, 10-4, An access management process 82 manages the video/audio delivery and the remote control of all the video/audio communication terminals 10-1, 10-2, 10-3, 10-4, . . . connected to the network 12, and functions in only one of such terminals connected to the network 12.

Figure 6:
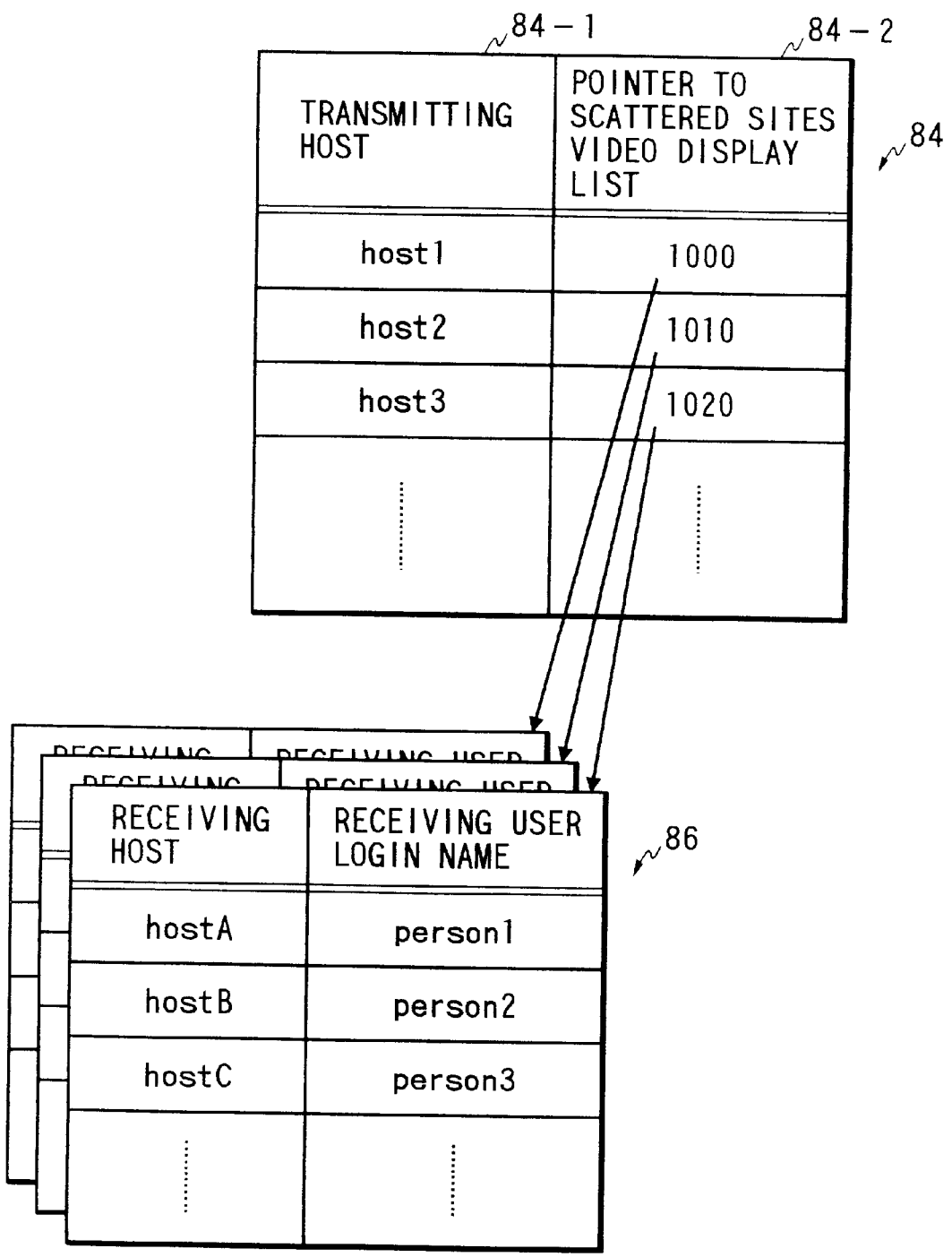
FIG. 6 is a view showing an example of the management table managed by the access management process of the present embodiment.

FIG. 6 in conjunction with FIG. 1 show the management table managed by the access management process 82, wherein a transmission process list 84 has a field 84-1 containing the names of all the video/audio communication terminals which are connected to the network 12 and for which the video transmission process 70 is operative, namely the names of the communication terminals delivering the video information (in case of the present embodiment, host names of the work stations employed), and a field 84-2 of the pointers to the scattered site video display list 86.

The scattered site video display list 86 is provided corresponding to the entries of the transmission process list 84, and registers the names and the log-in names of all the video/audio communication terminal receiving the image delivered from the corresponding transmission list. As an example, in case of FIG. 6, the image delivered from the host 3 is received (observed) by a person 1 (log-in name) of the host A (reception host), a person 2 (login name) of the host B (reception host), a person 3 (log-in name) of the host C etc. The log-in name is the name used for logging in the work station.

The reception process list is renewed when the scattered site video display process 72 is activated and when the camera images to be displayed are switched in the scattered site video display process 72 for example by the menu. In such operation, data including a log-in name/activating host name which is activating the scattered site video display process 72 and a new list of the host names of the cameras to be displayed are supplied, as a renewal request, from the scattered site video display process 72 to the management process 82.

FIG. 7 in conjunction with FIG. 1 show an example of the management table managed by the camera control server 74. A camera parameter management table 88 is renewed at each reception of the camera control command by the camera control server 74 through the network. Based on the camera parameter management table, the camera control server 74 sends control commands to the camera control device 34, the audio input control device 40, the audio output device 44 and the video display control device 48, thereby controlling the camera, the input characteristics of the microphone 38, the output characteristics of the speaker 42 and the display size of the icons on the monitor 46.

A content corresponding to a list 90 of the camera image observers and the camera operator is displayed on the monitor 46, by the video display control device 48. The icon of the camera operator is read from the secondary storage, based on the icon file name in the list 90, and is displayed. The list 90 is renewed, based on the renewal request transmitted from the access management process 82. Such renewal request is generated in the following situation. At first an information renewal request for the reception process list is issued from the management process 82 to the camera control server 74, which in response renews the list 90.

With respect to the camera operator, the information renewal request is issued to the access management process 82 when the host name to be controlled is entered in the camera control panel 60 displayed by the camera control client 76 and the access is achieved by the actuation of the access button 60d, or when the access is released by the actuation of the release button 60e. In response the access management process 82 similarly sends an information renewal request to the corresponding camera control server 74, which in response renews the list 90. The present invention is not limited by the kind of the network to be employed in the transmission of the above-mentioned information. For example there can be employed an Internet or a network based on IEEE 1394.

As explained in the foregoing, at the image transmitting side, the camera capable of panning, tilting and zooming operation is associated, at the side thereof, with a monitor 46 which is so mounted as to change the direction according to the image taking direction of the camera and, on such monitor, there is displayed information including the still icons or names of the observers of the image taken by the camera and the operator controlling the camera, and such information displayed on the monitor 46 is magnified or reduced in size according to the zooming ratio of the camera, whereby the user observed by such camera can more easily recognize the zoom ratio of the camera and the access information of the observers. Also the directionality (spreading, direction and sensitivity) of the microphone 38 and the sound field (spreading, direction and depth) of the speaker 42 are controlled according to the panning and/or tilting angle of the camera and the zoom ratio thereof, whereby the audio information transmitted together with the video information can be varied matching the change in the image by the camera control, thereby improving the realistic feeling to the observers.

The present invention has been explained by an embodiment as a television conference system which deals with moving images, but it is also applicable to a system dealing with still images. In such case, the image input means can be an original document scanner or other means such as a still video camera.

The present invention is applicable to the data processing not only in a system consisting of plural equipment as shown in FIG. 1 but also in an apparatus consisting of a single equipment.

Also the objects of the present invention can be naturally attained by supplying a system or an apparatus with a memory medium storing program codes of a software which realizes the functions of hosts and terminals in the foregoing embodiment and reading and executing such program codes, stored in the memory medium, by a computer (or a CPU or a MPU) of such system or apparatus.

In such case, the program codes themselves read from the memory medium realize the function of the foregoing embodiment, and the memory medium storing such program codes constitutes the present invention.

The memory medium for supplying the program codes includes, for example, a floppy disk, a hard disk, an optical disk, a magnetooptical disk, a CD-ROM, a CD-R, a magnetic tape, a non-volatile memory card and a ROM.

Also there are included not only the case where the functions of the foregoing embodiment are attained by the execution by the computer of the read program codes but also the case where an operation system functioning on the computer executes all or a part of the actual process based on the instructions of such program codes and the functions of the foregoing embodiment are attained by such process.

Furthermore there is included a case where the program codes read from the memory medium are stored in a memory provided in an expansion board connected to or inserted in the computer and a CPU or the like provided on such expansion board executes all or a part of the actual process based on the instructions of such program codes whereby the functions of the foregoing embodiment are attained by such process.

As will be readily understandable from the foregoing description, the foregoing embodiment allows the image transmitting side to easily and constantly confirm, in visual manner, the receivers of the transmitted image and the operator controlling the image input means of such image transmitting side.

Also the image of the camera operator, the directionality of the audio input and the sound field of the audio output are varied according to the panning, tilting and zooming operations of the camera, so that the video information and the audio information can be matched in the feeling of the observer, thus providing a system with improved realistic feeling.

What is claimed is:

1. An image communication system comprising:

image input means of which input state is remote controllable;

a transmission terminal including transmission means for transmitting the image, entered by said image input means, through a network;

a reception terminal including reception means for receiving the image, transmitted by said transmission means through said network, and control means for remote control of the input state of said image input means; and providing means for providing, at said transmission terminal, information on the control state of said image input means, wherein said providing means is adapted to provide identifying information of at least one of an observer of a transmitted image by said transmission means and an operator of said image input means, and wherein said identifying information represents a login name of said observer.

2. An image communication system according to claim 1, wherein said image input means is a video camera.

3. An image communication system according to claim 2, wherein said control state of said image input means is the zoom ratio of said video camera.

4. A transmission terminal adapted to be connected with a reception terminal including reception means for receiving an image transmitted through a network and control means for controlling the input state of image input means of a partner terminal through the network, comprising:
   image input means of which input state is remote controllable;
   transmission means for transmitting the image, entered by said image input means, through the network; and
   providing means for providing information on the control state of said image input means,
   wherein said providing means is adapted to provide identifying information of at least one of an observer of a transmitted image by said transmission means and an operator of said image input means, and
   wherein said identifying information represents a login name of said observer.

5. A transmission terminal according to claim 4, wherein said image input means is a video camera.

6. A transmission terminal according to claim 4, wherein the control state of said image input means is the zoom ratio of said video camera.

7. A reception terminal adapted to be connected with a transmission terminal including image input means of which input state is remote controllable and transmission means for transmitting the image, entered by said image input means, through the network, comprising:
   reception means for receiving the image transmitted by said transmission means through said network;
   control means for remote controlling the input state of said image input means; and
   means for receiving and transmitting an operator identifier to enable said transmission terminal to provide identifying information of at least one of an observer of a transmitted image by said transmission means and an operator of said image input means,
   wherein said identifying information represents a login name of said observer.

8. A reception terminal according to claim 7, wherein said input means is a video camera.

9. A reception terminal according to claim 7, wherein the control state of said image input means is the zoom ratio of said video camera.

10. An image/sound communication system comprising:
    image input means of which zoom ratio is remote controllable;
    sound input means;
    delivery means for delivering the image and the sound captured by said image input means and said sound input means onto a network;
    image display means for displaying the images of plural sites delivered by said delivery means; and
    means adapted to provide the person to be observed at the image transmitting side with information and to vary the displayed information according to the zooming operation of said image input means,
    wherein said information providing means is adapted to display both the still icons and login user names of the observer of the transmitted image and the operator of said image input means.

11. An image/sound communication system according to claim 10, wherein said information providing means is adapted to provide information relating to the zooming magnification of said image input means.

12. An image/sound communication system according to claim 10, wherein said information providing means is a monitor mounted at the side of said image input means.

13. An image/sound communication system according to claim 11, wherein said information providing means is a monitor mounted at the side of said image input means.

14. An image/sound communication system comprising:
    image input means of which at least one of the panning, tilting and zooming operations is remote controllable;
    sound input means;
    delivery means for delivering the image and the sound captured by said image input means and said sound input means onto a network;
    image display means for displaying images transmitted from plural sites by said delivery means; and
    means adapted to provide the person to be observed at the image transmitting side with information and to vary the directionality of said sound input means and the sound field of sound output means according to at least one of the panning, tilting and zooming operations of said image input means,
    wherein said information providing means is adapted to provide identifying information of at least one of an observer of a transmitted image by said transmission means and an operator of said image input means, and
    wherein said identifying information represents a login name of said observer.

15. An image/sound communication system according to claim 14, wherein said information providing means is a monitor mounted at the side of said image input means and adapted to vary the direction according to the image taking direction of said image input means.

16. A method comprising:
    receiving an image from an image input means of which input state is remote controllable from a reception terminal;
    transmitting from a transmission terminal the image, entered by said image input means, through a network;
    receiving at said reception terminal the image, transmitted from said transmission terminal through said network; and
    providing, at said transmission terminal, information on the control state of said image input means and identifying information of at least one of an observer of the transmitted image and an operator of said image input means,
    wherein said identifying information represents a login name of said observer.

17. A method comprising:
    receiving an image from image input means of which input state is remote controllable from a reception terminal;
    transmitting the image, entered by said image input means, through a network to said reception terminal; and providing information on the control state of said image input means and identifying information of at least one of an observer of the transmitted image and an operator of said image input means, wherein said identifying information represents a login name of said observer.

18. A method comprising:

receiving an image from image input means of which zoom ratio is remote controllable;

receiving sound from sound input means;

delivering the image and the sound from said image input means and said sound input means onto a network;

displaying the images of plural sites delivered by said delivering step; and displaying to the person to be observed at an image transmitting side both the still icons and login user names of the observer of the transmitted image and the operator of said image input means; and varying displayed information according to the zooming operation of said image input means.

19. A method comprising:

storing in advance a plurality of still icons of facial profiles of network users in a memory means;

receiving an image from image input means of which zoom ratio is remote controllable by an operator;

delivering the image from said image input means and sound from sound input means onto a network;

retrieving at least one icon corresponding to the operator of said image input means from said memory means;

displaying the images of plural sites delivered by said delivering step;

displaying to the person to be observed at an image transmitting side both the still icon of the operator and login user names of any observers of the transmitted image; and varying a magnification of the displayed still icon according to the zoom ratio of said image input means.

* * * * *

UNITED STATES PATENT AND TRADEMARK OFFICE
CERTIFICATE OF CORRECTION

PATENT NO. : 6,714,238 B2  
DATED : March 30, 2004  
INVENTOR(S) : Shinya Urisaka et al.

It is certified that error appears in the above-identified patent and that said Letters Patent is hereby corrected as shown below:

Column 6,
Line 32, please insert -- … -- after "10-4,"

Signed and Sealed this

Fourteenth Day of December, 2004

JON W. DUDAS
*Director of the United States Patent and Trademark Office*